252-146.   AU 165   EX
11-09-71   XR   3,619,347

[11] 3,619,347

[72] Inventor Glen V. Ireland, Jr.
    Brookfield, Wis.
[21] Appl. No. 807,064
[22] Filed Mar. 13, 1969
[45] Patented Nov. 9, 1971
[73] Assignee Salvox Mfg. Company
    Milwaukee, Wis.

[54] RECOVERY OF WASTEPAPER TREATED WITH UREA OR THE LIKE RESINS TO IMPART WET STRENGTH
6 Claims, No Drawings

[52] U.S. Cl................................................ 162/5,
    162/7, 162/80, 252/136, 252/142, 252/146
[51] Int. Cl..................................................... D21c 5/02
[50] Field of Search............................................162/4,5, 80,
    7; 252/136, 142, 146

[56] References Cited
UNITED STATES PATENTS

| | | | |
|---|---|---|---|
| 2,394,273 | 2/1946 | Thomas...................... | 162/4 |
| 2,396,776 | 3/1946 | Douty et al. .................. | 252/136 |
| 2,477,181 | 7/1949 | Holman........................ | 252/136 |
| 2,650,156 | 8/1953 | Jones............................ | 252/136 X |
| 3,245,868 | 4/1966 | Espenmiller et al. ......... | 162/4 |

*Primary Examiner*—Howard R. Caine
*Attorney*—Ira Milton Jones

ABSTRACT: Wastepaper treated typically with urea resins or the like to impart high wet strength is recovered by treating it in a standard paper pulper in an aqueous medium with a mixture of sulfuric and phosphoric acid and, advantageously, an emulsifying agent.

3,619,347

RECOVERY OF WASTEPAPER TREATED WITH UREA OR THE LIKE RESINS TO IMPART WET STRENGTH

BACKGROUND

This invention relates to the recovery of high quality pulp and paper from waste paper typically containing urea, melamine and like resins normally used to treat paper to impart high wet strength thereto, by the removal of the agents imparting the wet strength through the treatment of such waste paper with a mixture of sulfuric acid and phosphoric acid and, advantageously, emulsifying agents and to the composition useful in such removal.

The very wide and increasing use of wet strength papers, both chemical pulp and ground wood, for the production of towels, tissues, boards, fine paper, and cartons has created a great need for the recovery of wet strength waste paper and broke in a condition suitably for reuse. It is known that conventionally wet strength is imparted by treating paper stock with resins, especially urea and melamine resins. No truly commercially successful process is known for the recovery of such waste paper and, as a result, wet strength papers typically are discarded or destroyed. For instance, U.S. Pat. No. 3,245,868 shows a very complicated and expensive process for the recovery of paper broke containing a wet strength resin. This patent makes particular mention of burning wet strength broke because this may be the most inexpensive manner of disposing of it.

It is therefore, a major object of this invention to provide an uncomplicated and economically feasible process for the recovery of wet strength waste paper (which includes broke) in a condition rendering it useful for the same purposes for which it was useful before having wet strength imparted thereto.

It is a special object of this invention to provide a process and a composition for treating wet strength waste paper to remove the ingredients imparting wet strength which may be used in ordinary waste paper recovery mills without special installation.

It is another special object of the invention to render waste paper impregnated or coated with wet strength imparting resins usable in the same way it was usable before being treated by treating such waste paper in a manner which is superior to and more economical than any known manner of achieving kindred results.

It is a further special object of this invention to provide compositions and process which will minimize deterioration and erosion of the paper mill equipment.

It is a particular object of this invention to provide a composition and a process which will greatly increase the throughput.

Other objectives, features, and characteristics of the invention will become apparent from the following more detailed description thereof.

SUMMARY OF THE INVENTION

In spite of the lack of success in the prior art I have now found that the objectives of this invention can be achieved in an extremely simple, inexpensive and facile manner by treating wet strength waste paper with a composition containing both sulfuric and phosphoric acid and, most advantageously, also containing an emulsifying agent. Where equipment is made of metals sensitive to corrosion, one should use a corrosion inhibitor for metals. High molecular weight amines, such as the polyethylene oxide ethers of dehydroabietylamine, are especially well adapted to inhibiting the corrosion effect of a combination of sulfuric acid and phosphoric acid on metals conventionally used in paper making machinery. All types of emulsifying agents having balanced lipophilic and hydrophilic properties may be used in the compositions hereof, i.e. nonionic emulsifiers, anionic emulsifiers such as ordinary soaps, cationic emulsifiers such as quaternary ammonium compounds, but nonionic emulsifiers are preferred, especially the alkylphenyl ethers, for economic reasons and due to the fact they have no adverse effect upon the pH of the treatment baths. Regardless of the formulation used, they can be used in an aqueous bath in a conventional paper pulper, such as the so-called hydropulper; to disintegrate the resins imparting the wet strength to the paper thereby permitting the pulping of the paper and the dispersion of the resins in the aqueous media. The pulp may then be removed from the pulper and washed to remove absorbed liquids in conformity with practices usually followed in the removal of digesting liquids from chemical pulps.

The amount of phosphoric acid relative to the amount of sulfuric acid may be varied widely for any substantial amount of phosphoric acid seems to have an important impact on the performance of the sulfuric acid. In general the phosphoric acid constitutes a minor percentage of the acid component of the composition hereof. Typically the phosphoric acid content varies from 1–20 percent and the sulfuric acid content from 99 to 80 percent but one may obtain the advantages of the invention with economic penalties by using from 80–20 percent sulfuric per 20 to 80 percent phosphoric acid.

The amount of emulsifying agent is determined by the amount of wet-imparting resin to be dispersed and typically would be 0.25 to 5 percent of the acid content of the composition.

A formulation very successfully used commercially is set out below as formulation W:

FORMULATION W

| Chemical | Percentage By Weight |
|---|---|
| Water | 58.3 |
| Sulfuric Acid (93.2%) | 34.9 |
| Phosphoric Acid (75%) | 3.3 |
| Emulsifier (ethoxylated octyl-phenol containing 9–10 mols ethylene oxide) | 3.5 |
| Amine anticorrosive agent (where needed) | 0.75 |

This formulation has been extensively sold commercially by Soluox Manufacturing Co., 11725 W. Fairview Avenue, Milwaukee, Wisconsin 53226, as Soluox Special A-165.

It will be understood that the water used in composition is merely present to dilute the acids and make them less corrosive and that the acids used are commercial grades. Obviously 100 percent acids could be used. It will be realized that other alkylphenyl ethers may be used as substantial equivalents of the one actually used such as those derived from nonylphenol and that the number of ethylene oxide groups may vary widely as, for instance, from 5–10 oxyethylene groups.

A theory of the invention is not necessary to an understanding of the invention, but it does seem that the phosphoric acid and sulfuric acid have an unobvious complementary or synergistic effect upon one another when used in the recovery of high wet strength papers.

The unobvious impact of the two acids upon one another can be observed by comparing the use alone, and in combination in the defibering of wet strength paper. Tests, were conducted in the pulper of a large paper mill on paper treated with 3.8 percent by weight of urea formaldehyde to impart high wet strength. Defibering was considered complete when the pulp passes through one-eighth inch extraction plates in the bottom of the hydropulper. The same temperatures and consistencies were used in each test, the temperature being 160° F. Also the same quantities of the active treating agents were used in each instance. The results are set out below in table I:

TABLE I

| Defibering Agent | Defibering Times |
|---|---|

| | |
|---|---|
| Sulfuric Acid | 73 minutes |
| Phosphoric Acid | 82 minutes |
| Hydrochloric Acid | 78 minutes |
| Formulation W | 28 minutes |
| Aluminum Sulfate | did not defiber in 4 hrs. |

The octylphenol ethers and nonylphenol ethers mentioned above are available commercially from many sources such as the Olin Mathieson Chemical Company under the designation G-300 (octylphenyl ethers) and B-200 (nonylphenyl ethers) and like products are available from Rohm and Hass under its Triton trade name. Other suitable ionic emulsifiers are readily available but generally speaking are somewhat more expensive. For instance, ethers of fatty alcohols, fatty acid amides and other lipophilic compounds containing active hydrogen atoms may be used.

Any number of anticorrosive agents can be used in formulation W, but those that performed best, in order of their preference, were: Polyrad 98 (Hercules), Propargl Alcohol, Butynediol, and Antarate 3482 (all General Aniline and Film Corp.)

While the composition set out in formulation W has proven most satisfactory from a practical viewpoint, it will be understood that the complementary effect of the two acids can be obtained by using other proportions thereof and that the emulsifying agents are very desirable in the formulations for wetting the paper and suspending the resins removed from the defibered paper in order that the resin may be separated from the paper pulp. Table II below sets out in generalized form operable and most effective ranges if the ingredients used in formulations typified by formulation W:

TABLE II

| Ingredient | Percentage by Weight | |
|---|---|---|
| | Operable | Most Effective |
| Water | 0–80 | 10 |
| Sulfuric Acid (100%) | 10–80 | 81 |
| Phosphoric Acid (100%) | 1–20 | 13 |
| Emulsifier | 0.25–6 | 3.5 |
| (where needed) | 0.5–2 | 0.75 |

DETAILS

The following purely purelu illustrative examples will further facilitate an understanding of the invention. In the examples, it will be understood that after wet strength imparting resins are disintegrated off into the aqueous medium of the conventional hydropulper and the waste paper reduced to a pulp that the pulp and the aqueous media are separated from one another in the manner conventional in the paper industry using the same type of equipment used in separating digested chemical pulp from treatment liquors and that the separated pulp may be washed and otherwise treated as is conventional in the paper industry. Although the waste paper may be shredded or otherwise modified before introduction into the pulper, one of the great advantages of the invention resides in the fact that waste paper, as received, may be introduced into the pulper and that the examples illustrate this procedure. It will be understood further that waste paper includes contaminated paper in which has been previously used and discarded as well as the so-called "broke" obtained in fabricating the paper impregnated or coated with urea-formaldehyde, melamine resins and the like.

EXAMPLE I (Batch Process)

Use 2,000 lbs. of wet strength fibers in hydropulper or similar type of equipment used to defiber in any paper mill, along with 4,000 gals. hot water—160° F. to 200° F. Water can be heated by either hot water tank, preheater or steam line in the hydropulper. Keep consistency at approximately 6 percent pulp.

Add from 3 to 5 gals. of formulation W (undiluted) to hydropulper, depending on amounts or percentages of wet strength resin, along with 50 lbs. dry alum where the pH conditions require it. The pulping time will be approximately 15 to 60 minutes, depending on the type of agitation in the pulper and the particle size required to pass through extraction plates prior to refining. The process works equally well for urea formaldehyde or melamine types of wet strength resins. However, the temperature range should be considerably less, namely from 100° F. to 125° F. for recovery of milk carton stock or for reclaiming the paper from similar poly coated containers wherever poly extraction is to take place in the hydropulper.

This process does not affect the strength or cellulose in the fiber in any way. The only injury to the fiber will be from the Jordan or refining.

As to the temperatures of the water, the two ranges specified (160° to 200° F. and 100° to 125 125° F.) are average. Generally speaking, with lower temperature, more pulping time is required as is more of formulation W. The higher temperatures involve greater heating costs, and while some saving in formulation W and pulping time is possible, it is questionable as to whether it would be practicable to raise the temperature much beyond the average range given or use super atmospheric pressure although higher temperatures and super atmospheric pressure could be used when reclaiming other than poly coated stocks.

Likewise there is nothing critical about the amount of alum employed in the process. Typically the pH is adjusted to about 2 to 5.

The amount of formulation W or the like, used in the process will depend upon the amount of wet strength resin used. In general, it is wiser to use a slight excess of formulation W or the like rather than an insufficient amount. If the paper is not sufficiently pulped, the reclaimed paper is either thrown away or reprocessed once more at much greater expense than would have been entailed by addition of an extra gallon or two of the solvent to the hydropulper in the first place.

Where the temperature of the water cannot be raised to at least 160° F., or if the time cycle will not permit proper adjustment, the amount of formulation W is adjusted so that the process will work in the system involved. This may involve addition to the hydropulper of from 50 to 100 lbs. of alum and increase in formulation W so that from 5 gals. to 10 gals. thereof is used per ton of waste fiber to make up for lower water temperature or lack of pulping time. Thus, in general, formulation W is used in an amount equaling about 2 to about 5 percent of the weight of the waste paper being treated.

EXAMPLE II (Continuous Process)

The continuous system in operation is figured on a per ton basis of dry fibers containing wet strength resins, keeping consistency of stock at approximately 4–6 percent consistency in the hydropulper. Premixing of formulation W (water soluble wet strength dissolver) is preferable if a plastic fiberglass or stainless steel premixing tank is available. For premixing, 5 parts water are used to 1 part of formulation W. Agitate to mix, then mixing device can be turned off. However, premixing is not essential and the process can be satisfactorily practiced without it if special premixing tanks are not available.

Add approximately 50 lbs. dry alum, or equivalent in liquid alum, per ton of dry fiber in a continuous basis wherever the pH of the water calls for its use.

Pump or dispense into hydropulper at a rate of 30 gals. of formulation W premix per ton of dry fiber added to the hydropulper. Keep temperature in the hydropulper at approximately 165° to 185° F. this can be done by either a steamline in the hydropulper or a preheated hot water tank.

Additions to the hydropulper and out flows therefrom are regulated so that the pulping time should be approximately 15 to 30 minutes, depending on the size of extraction plates prior to refining.

This process is good for all types of wet strength fibers containing ureasformaldehyde or melamine resins and kindred resins.

This process applies for all types of kraft paper, corrugated or plain, and to other chemical pulps and to ground wood.

Once the resin substances are in the treatment liquor used to defiber, the treatment liquor and pulp is flowed through the system and over a thicker (when available) along with the normal dilutions in the paper machine and the treatment liquors will eventually be washed away, never leaving a buildup of the foreign substances in the system because of the continual addition of fresh or new water to maintain a designated water level. The water level seldom varies to the point where it will affect the end results and can be used repeatedly by returning the water to the hydropulper.

It is definitely more economical and practical for paper mills to but the cheaper contaminated grades of waste paper, using the compositions and process hereof to remove the foreign substances, than it is to purchase the waste grades free of foreign materials and contamination at a far greater cost, or, as in some instances, installing expensive apparatus as set out in the prior art.

THe process hereof is easy to use, eliminates the necessity for the installation of expensive steam type dispersal equipment, and upkeep is considerably less expensive and does a significantly better job with no added investment.

The process hereof will not affect the strength of cellulose in the fiber in any way. The only injury to the fiber will be from the refining or pulping actions, as is usual. There will be no remaining odor to the finished product as a result of this process.

It will be apparent from the foregoing disclosure that a plurality of emulsifiers may be used in the compositions hereof. Thus it will be understood that "emulsifying agent" is used herein to encompass one or more emulsifiers.

It will be understood the details given herein are included for illustrative purposes and that those skilled in the paper arts can modify and vary these details without departing from the spirit of the invention or the scope thereof as defined in the appended claims.

What is claimed as my invention is:

1. A process for recovering paper pulp from wet strength waste papers having wet strength imparted thereto by a synthetic resin which comprises said papers at a temperature of about 100° to 200° F. in an aqueous medium in a paper pulper with an amount of composition having an acidic component consisting essentially of sulfuric acid as a major acid component and, by weight, at least 1 percent as much phosphoric acid and about 0.25 to about 5 percent as much of an emulsifying agent having balanced lipophilic and hydrophilic properties as the total quantity of said acidic component in a ratio of at least about 0.8 percent by weight of the composition in relation to paper pulp to separate said resin from said paper and to disperse the paper in the aqueous medium as a paper pulp, and thereafter separating the paper pulp from the aqueous medium.

2. The process of claim 1 wherein the composition consists essentially of about 86 percent sulfuric acid, about 7 percent phosphoric acid and about 7 percent emulsifier.

3. The process of claim 1, the composition further containing as an anticorrosive agent ethylene oxide ether of dehydroabietylamine.

4. The process of claim 1 wherein the emulsifying agent is an alkylene oxide ether of an alkyl phenol.

5. The process of claim 1 wherein a metal corrosion inhibitor is used and the separated pulp is washed to remove separated contaminants.

6. The process of claim 1 wherein the said acidic component is about 2–5 percent of the weight of said waste paper.

* * * * *

UNITED STATES PATENT OFFICE
CERTIFICATE OF CORRECTION

Patent No. 3,619,347          Dated November 9, 1971

Inventor(s) Glen V. Ireland

It is certified that error appears in the above-identified patent and that said Letters Patent are hereby corrected as shown below:

Face of Patent (Assignee) "Salvox" should be ---Solvox---

Column 2 lines 44 & 45 (Spec. page 6 lines 13 & 16)
"Soluox" should be ---Solvox---

Column 3 line 19 (Spec. page 8 line 16)
"Propargl" should be ---Propargyl---

Column 3 line 31 (Spec. page 8 line 29)
"if" should be ---of---

Column 3 line 44 (Spec. page 9 line 8)
Insert "Anticorrosive Agent" before ---(where needed)---

Column 3 line 47 (Spec page 9 line 11)
Delete "purelu" after ---purely---

Column 3 line 63 (Spec. page 10 line 2)
Delete "in" after ---paper---

Column 4 line 18 (Spec. page 11 line 6)
Delete " 125 " after ---to---

Column 5 line 8 (Spec. page 13 line 24)
"thicker" should be ---thickener---

Column 5 line 17 (Spec. page 14 line 6)
"but" should be ---buy---

Column 6 line 9 (Claim 1)
Insert "pulping" after ---comprises---

Signed and sealed this 25th day of April 1972.

(SEAL)
Attest:

EDWARD M. FLETCHER, JR.
Attesting Officer

ROBERT GOTTSCHALK
Commissioner of Patents